(12) United States Patent
Kong

(10) Patent No.: US 11,594,934 B2
(45) Date of Patent: Feb. 28, 2023

(54) BUSBAR, MOTOR, AND POWER TRANSMISSION SYSTEM USING SAME

(71) Applicant: LG INNOTEK CO., LTD., Seoul (KR)

(72) Inventor: Bong Bae Kong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 171 days.

(21) Appl. No.: 17/115,390

(22) Filed: Dec. 8, 2020

(65) Prior Publication Data

US 2021/0091624 A1 Mar. 25, 2021

Related U.S. Application Data

(63) Continuation of application No. 16/719,362, filed on Dec. 18, 2019, now Pat. No. 10,892,663, which is a
(Continued)

(30) Foreign Application Priority Data

Nov. 5, 2015 (KR) .......................... 10-2015-0155177

(51) Int. Cl.
*H02K 3/52* (2006.01)
*H02K 11/00* (2016.01)
(Continued)

(52) U.S. Cl.
CPC ........... *H02K 3/522* (2013.01); *B62D 5/0403* (2013.01); *H02K 3/28* (2013.01); *H02K 5/225* (2013.01);
(Continued)

(58) Field of Classification Search
CPC .......... H02K 3/522; H02K 3/28; H02K 5/225; H02K 11/33; H02K 2203/09; H02K 2213/03; B62D 5/0403
See application file for complete search history.

(56) References Cited

U.S. PATENT DOCUMENTS 10,547,228 B2 * 1/2020 Kong ....................... H02K 3/28
2008/0136274 A1 6/2008 Fujii et al.
(Continued)

FOREIGN PATENT DOCUMENTS

CN 104467299 A 3/2015
EP 2 256 906 A1 12/2010
(Continued)

OTHER PUBLICATIONS

Office Action dated Dec. 27, 2021 in Chinese Application No. 202010425431.8.
(Continued)

*Primary Examiner* — Thomas Truong
(74) *Attorney, Agent, or Firm* — Saliwanchik, Lloyd & Eisenschenk

(57) ABSTRACT

Disclosed in one embodiment is a busbar comprising: an insulating body; a plurality of neutral terminals arranged in the insulating body; and a plurality of first driving terminals, second driving terminals, and third driving terminals arranged in the insulating body, wherein the plurality of neutral terminals, first driving terminals, second driving terminals, and third driving terminals are electrically insulated, respectively, and the shape of the plurality of the first driving terminals, the second driving terminals, and the third driving terminals are the same.

20 Claims, 9 Drawing Sheets

Related U.S. Application Data continuation of application No. 15/774,185, filed as application No. PCT/KR2016/012644 on Nov. 4, 2016, now Pat. No. 10,547,228.

(51) Int. Cl.
*B62D 5/04* (2006.01)
*H02K 5/22* (2006.01)
*H02K 3/28* (2006.01)
*H02K 11/33* (2016.01)

(52) U.S. Cl.
CPC ......... *H02K 11/33* (2016.01); *H02K 2203/09* (2013.01); *H02K 2213/03* (2013.01)

(56) References Cited

U.S. PATENT DOCUMENTS

| | | | |
|---|---|---|---|
| 2009/0039720 A1* | 2/2009 | Tsukashima | H02K 5/225 310/71 |
| 2011/0278974 A1 | 11/2011 | Matsuyama et al. | |
| 2013/0257200 A1 | 10/2013 | Nakayama et al. | |
| 2015/0076944 A1 | 3/2015 | Shim et al. | |
| 2015/0333586 A1 | 11/2015 | Hirotani et al. | |
| 2016/0020658 A1* | 1/2016 | Tamura | H02K 9/19 310/71 |

FOREIGN PATENT DOCUMENTS

| | | |
|---|---|---|
| EP | 2 849 315 A2 | 3/2015 |
| JP | 2008-022626 A | 1/2008 |
| JP | 2009-247058 A | 10/2009 |
| JP | 2010-239772 A | 10/2010 |
| JP | 5463663 B2 | 1/2014 |
| JP | 2014-23396 A | 2/2014 |
| JP | 2014-79090 A | 5/2014 |
| KR | 20-2011-0008582 U | 9/2011 |
| KR | 10-2014-0016035 A | 2/2014 |
| KR | 10-2015-0031634 A | 3/2015 |
| WO | WO-2014/167645 A1 | 10/2014 |

OTHER PUBLICATIONS

International Search Report in International Appiication No. PCT/KR2016/012644, filed Nov. 4, 2016.
Supplementary European Search Report dated Aug. 14, 2018 in European Application No. 16862471.6.
Notice of Allowance dated Sep. 18, 2019 in U.S. Appl. No. 15/774,185.
Office Action dated Oct. 20, 2020 in Japanese Application No. 2018-522910.
Notice of Allowance dated Sep. 10, 2020 in U.S. Appl. No. 16/719,362.
Office Action dated May 30, 2022 in Korean Application No. 10-2015-0155177.

* cited by examiner

BUSBAR, MOTOR, AND POWER TRANSMISSION SYSTEM USING SAME

CROSS-REFERENCE TO RELATED APPLICATIONS

This application is the continuation of U.S. application Ser. No. 16/719,362, filed Dec. 18, 2019; which is the continuation of U.S. application Ser. No. 15/774,185, filed May 7, 2018, now U.S. Pat. No. 10,547,228, issued Jan. 28, 2020; which is the U.S. national stage application of International Patent Application No. PCT/KR2016/012644, filed Nov. 4, 2016, which claims priority to Korean Application No. 10-2015-0155177, filed Nov. 5, 2015, the disclosures of each of which are incorporated herein by reference in their entirety.

TECHNICAL FIELD

The present invention relates to a busbar, a motor, and a power transmission system including the same.

BACKGROUND ART

Generally, an electronic power steering (EPS) system is a system for securing steering safety of a vehicle, and allows easy handling by supplying power using a motor in a direction in which a driver steers the vehicle.

Such an EPS system may improve a steering performance and a steering feeling by controlling an operation of the motor according to a driving condition unlike a conventional hydraulic power steering (HPS) system.

Specifically, the EPS system controls an inverter to drive the motor according to driving conditions detected by a vehicle speed sensor, a torque angle sensor, a torque sensor, and the like of an electronic control unit (ECU). Accordingly, since a turning safety is secured and a rapid restoring force is provided, the driver may safely drive.

Recently, safety requirements have been increased in the field of vehicles. Accordingly, a technology in which a safety of a vehicle is secured even when some parts (ECU or inverter) of the EPS system are in impossible operation states is required.

DISCLOSURE

Technical Problem

The present invention is directed to providing a busbar with which a plurality of three-phase circuits may be formed.

The present invention is also directed to providing a motor having a plurality of three-phase circuits which are independently controlled.

The present invention is also directed to providing a power transmission system in which a plurality of inverters control a motor.

Technical Solution

One aspect of the present invention provides a busbar including: an insulating body; a plurality of neutral terminals disposed on the insulating body; and a plurality of first driving terminals, second driving terminals, and third driving terminals disposed on the insulating body, wherein the plurality of neutral terminals, first driving terminals, second driving terminals, and third driving terminals are electrically insulated from each other, and the plurality of first driving terminals, second driving terminals, and third driving terminals have the same shape.

The insulating body may include insertion grooves in which the plurality of first driving terminals, second driving terminals, and third driving terminals are disposed.

The plurality of neutral terminals may have the same shape.

The plurality of first driving terminals, second driving terminals, and third driving terminals may be coplanar.

A radius of a curvature at one end of each of the plurality of first driving terminals, second driving terminals, and third driving terminals may be different from that of a curvature at the other end thereof.

The curvature of each of the plurality of first driving terminals, second driving terminals, and third driving terminals may be changed from the one end of each of the plurality of first driving terminals, second driving terminals, and third driving terminals toward the other end thereof.

Each of the plurality of first driving terminals, second driving terminals, and third driving terminals may include: a body portion; a connection portion connected to the body portion; and a terminal portion protruding from the body portion in a direction of a shaft.

The connection portion may include a first connection portion connected to one end of the body portion, and a second connection portion connected to the other end of the body portion.

The busbar may further include extension portions disposed between the connection portion and the body portion, wherein the extension portions may extend in a direction perpendicular to the direction of the shaft, and a length of the extension portion connected to the first connection portion may be different from that of the extension portion connected to the second connection portion.

The length of the extension portion connected to the first connection portion may be greater than that of the extension portion connected to the second connection portion.

A curvature of the body portion may be changed from one end of the body portion toward the other end thereof.

Another aspect of the present invention provides a busbar including an insulating body and a plurality of first, second, and third driving terminals disposed on the insulating body, wherein a diameter of a first virtual circle connecting one ends of the plurality of first, second, and third driving terminals is less than that of a second virtual circle connecting the other ends thereof.

The insulating body may include a first hole formed at a center of the insulating body, and a diameter of the first hole may be less than that of the first virtual circle.

Centers of the first hole, the first virtual circle, and the second virtual circle may be the same.

Still another aspect of the present invention provides a motor including a stator including a first coil set and a second coil set, and a busbar including a first terminal set electrically connected to the first coil set to constitute a first circuit, a second terminal set electrically connected to the second coil set to constitute a second circuit, and an insulating body configured to fix the first and second terminal sets, wherein each of the first terminal set and the second terminal set includes at least one first driving terminal, at least one second driving terminal, and least one third driving terminal, and the first driving terminal, the second driving terminal, and the third driving terminal have the same shape.

A curvature of each of the first driving terminal, the second driving terminal, and the third driving terminal is changed from one end of each of the first driving terminal, the second driving terminal, and the third driving terminal toward the other end thereof.

Yet another aspect of the present invention provides a power transmission system including: a motor including a first circuit and a second circuit; a first driving unit electrically connected to the first circuit; a second driving unit electrically connected to the second circuit; and a control unit configured to control the first driving unit and the second driving unit, wherein the first circuit includes a first coil set and a first terminal set configured to electrically connect the first coil set, and the second circuit includes a second coil set and a second terminal set configured to electrically connect the second coil set.

Advantageous Effects

According to embodiments, since a plurality of three-phase circuits can be formed in a single motor, reliability can be improved.

Since shapes of terminals are the same, a manufacturing cost can be reduced.

Since the terminal is formed in a spiral shape, the plurality of terminals can be densely disposed, and thus a size of the plurality of terminals can be reduced.

Since a power terminal is separately manufactured, a manufacturing process can be simplified.

Since the terminals having the same shape are assembled, a structure of an insulator can be simplified, and a productivity of an assembly process can be improved.

Useful advantages and effects of the present invention are not limited to the above-described contents, and may be more easily understood from specific embodiments of the present invention which will be described.

MODES OF THE INVENTION

Figure 1:
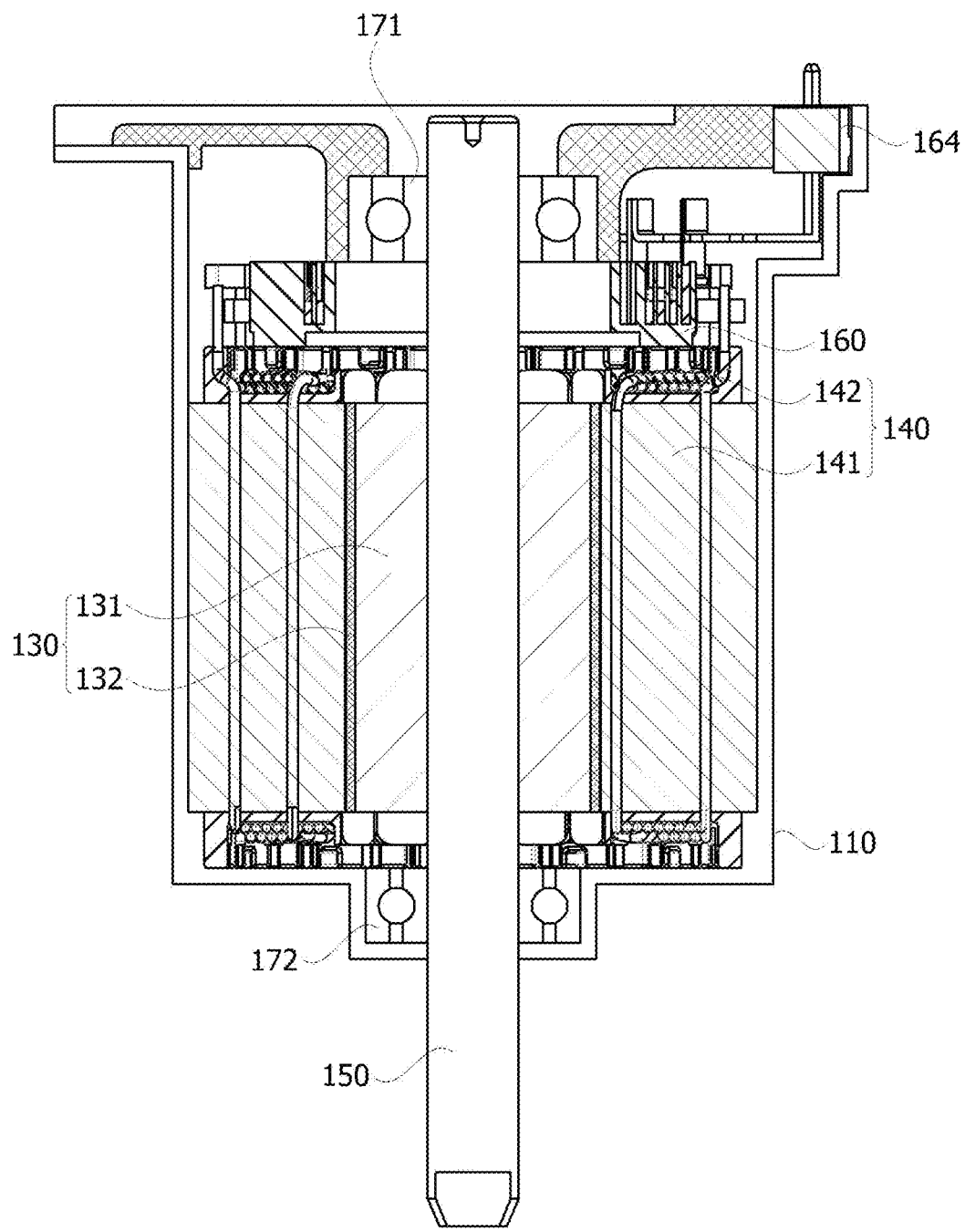
FIG. 1 is a cross-sectional view illustrating a motor according to one embodiment of the present invention.

While the present invention may be modified in various ways and take on various alternative forms, specific embodiments thereof are shown in the accompanying drawings and described in detail below as examples. However, there is no intent to limit the present invention to the particular forms disclosed. On the contrary, the present invention is to cover all modifications, equivalents, and alternatives falling within the spirit and scope of the appended claims.

It should be understood that, although terms "first," "second," and the like may be used herein to describe various elements, the elements are not limited by the terms. The terms are only used to distinguish one element from another. For example, a first element could be termed a second element, and similarly, a second element could be termed a first element without departing from the scope of the present invention. As used herein, the term "and/or" includes any and all combinations of one or more of the associated listed items.

Terms used in the present specification are merely used to describe exemplary embodiments, and are not intended to limit the embodiments. An expression used in the singular encompasses the expression of the plural, unless it has a clearly different meaning in the context. In the present specification, it should be understood that the terms such as "including," "having," and "comprising" are intended to indicate the existence of features, numbers, steps, actions, components, parts, or combinations thereof disclosed in the specification, and are not intended to preclude the possibility that one or more other features, numbers, steps, actions, components, parts, or combinations thereof may exist or be added.

In the description of embodiments, when an element is referred to as being "on or under" another element, the term "on or under" refers to either a direct connection between two elements or an indirect connection between two elements having one or more elements formed therebetween. In addition, when the term "on or under" is used, it may refer to a downward direction as well as an upward direction with respect to an element.

Hereinafter, embodiments will be illustrated in detail with reference to the accompanying drawings, and components that are the same or correspond to each other regardless of reference numerals will be referred to by the same or similar reference numerals, and redundant descriptions thereof will be omitted.

FIG. 1 is a cross-sectional view illustrating a motor according to one embodiment of the present invention.

Referring to FIG. 1, a motor 100 according to one embodiment of the present invention includes a housing 110, a stator 140 disposed in the housing 110, a rotor 130, a rotating shaft 150, and a busbar 160.

The housing 110 may accommodate the stator 140 and the rotor 130. The housing 110 may further include a cooling structure (not shown) to easily dissipate internal heat thereof. The cooling structure may be an air or water cooling structure, but is not limited thereto.

The stator 140 is inserted into an inner space of the housing 110. The stator 140 may include a stator core 141 and coils 142 wound around the stator core 141. The stator core 141 may include a plurality of divided cores. However, the stator core 141 is not limited thereto, and may also be integrally formed.

The rotor 130 may be disposed to rotate with respect to the stator 140. That is, the rotor 130 may rotate inside the stator 140. A rotor magnet 132 may be installed on an outer circumferential surface of the rotor 130.

The rotating shaft 150 may be coupled to a central portion of the rotor 130. Accordingly, the rotor 130 and the rotating shaft 150 may rotate together. The rotating shaft 150 may be supported by a first bearing 171 disposed at one side thereof and a second bearing 172 disposed at the other side thereof.

The busbar 160 may include a plurality of terminals electrically connected to the coils 142 wound around the stator 140 and configured to connect a U-phase, a V-phase, and a W-phase. A power terminal 164 of the busbar 160 may be exposed at the outside to be electrically connected to an external power or inverter.

Figure 2:
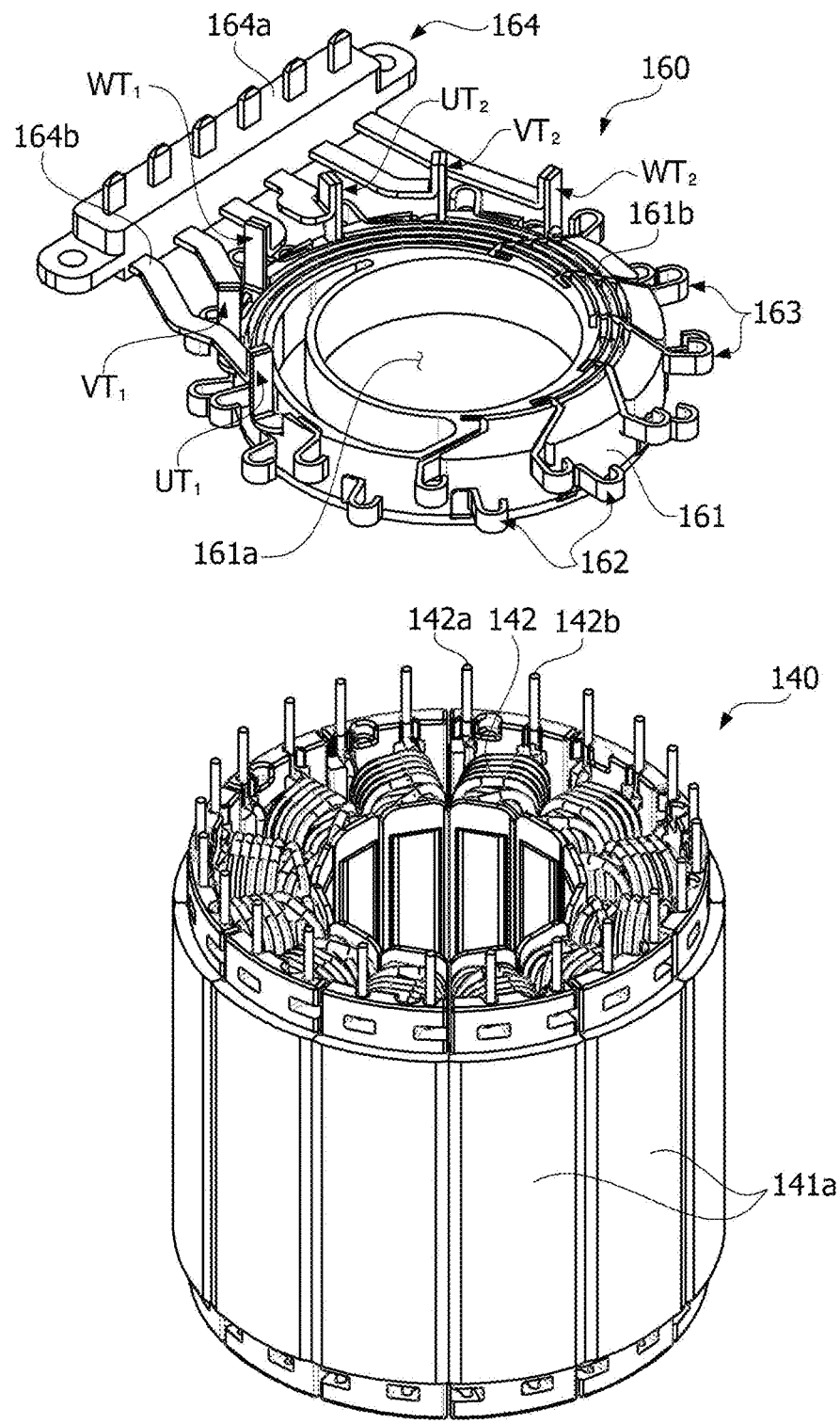
FIG. 2 is a view for describing a state in which a busbar and a stator according to one embodiment of the present invention are electrically connected.
Figure 3:
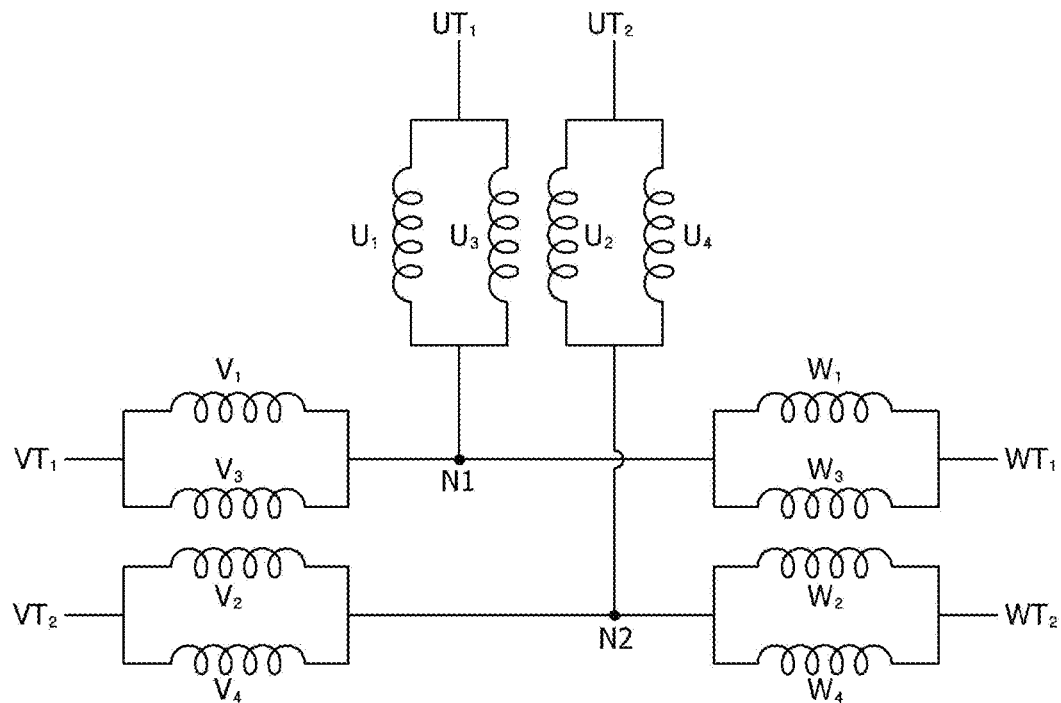
FIG. 3 is a view for describing a three-phase circuit of the motor according to one embodiment of the present invention.
Figure 4:
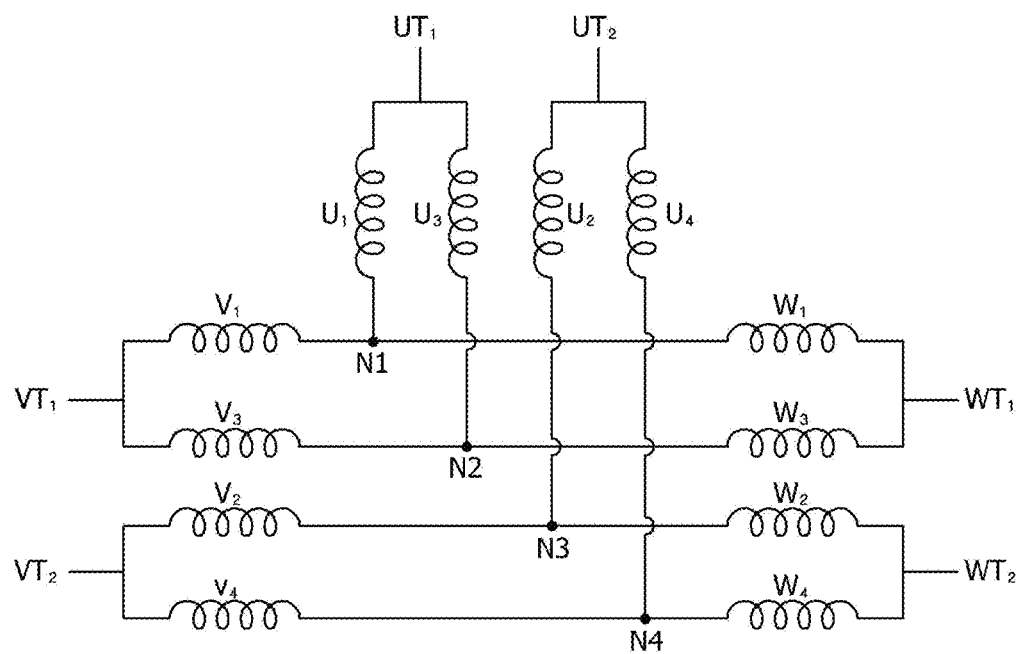
FIG. 4 is a view illustrating a modified example of FIG. 3.
Figure 5:
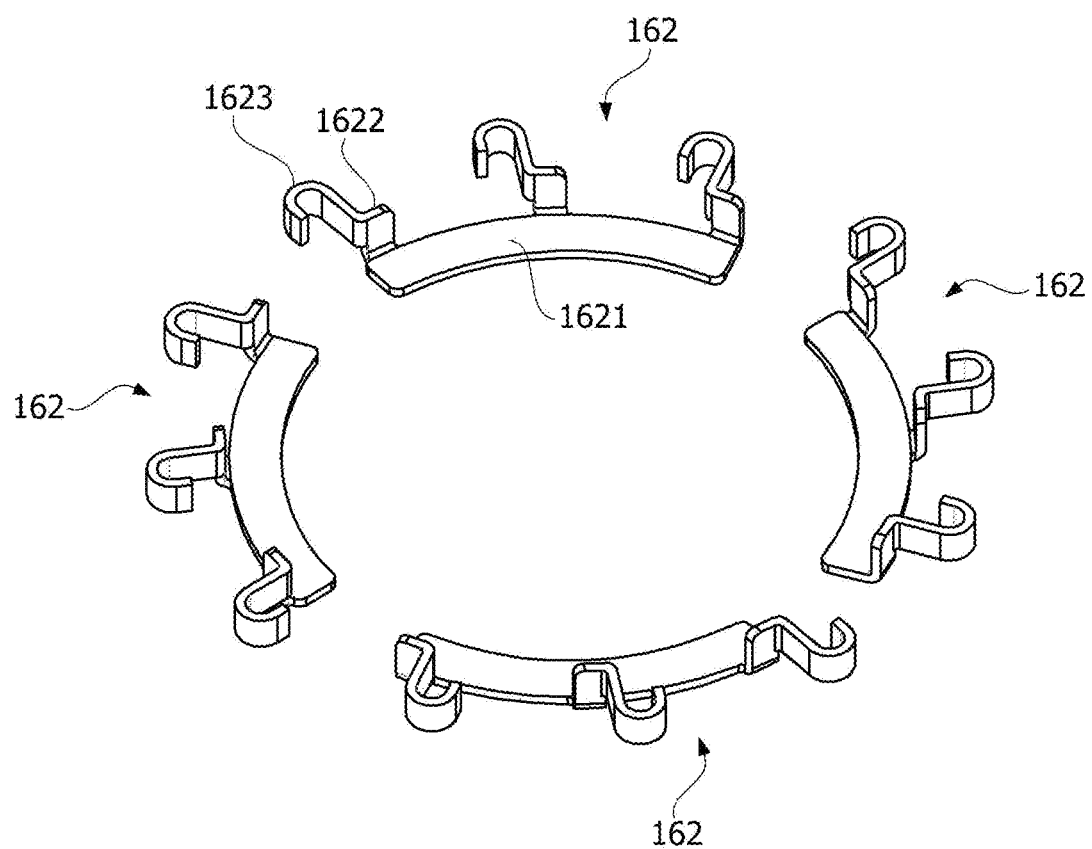
FIG. 5 is a view for describing an arrangement of a plurality of neutral terminals according to a circuit of FIG. 4.

FIG. 2 is a view for describing a state in which a busbar and a stator according to one embodiment of the present invention are electrically connected, FIG. 3 is a view for describing a three-phase circuit of the motor according to one embodiment of the present invention, FIG. 4 is a view illustrating a modified example of FIG. 3, and FIG. 5 is a view for describing an arrangement of a plurality of neutral terminals according to a circuit of FIG. 4.

Referring to FIG. 2, the stator 140 may include a plurality of divided cores 141*a* and a plurality of coils 142 wound around the divided cores 141*a*. The coil 142 may include one end 142*a* and the other end 142*b* which extend from the divided core 141*a* in a direction of a shaft (a longitudinal direction of the rotating shaft). The one end 142*a* may be a point from which coil winding starts, and the other end 142*b* may be a point at which the coil winding ends. However, the one end 142*a* and the other end 142*b* are not limited thereto. For example, the one end 142*a* may be a position at which coil winding ends, and the other end 142*b* may be a position from which the coil winding starts.

The one end 142*a* of each of the plurality of coils 142 may be electrically connected to a neutral terminal 162, and the other end 142*b* may also be electrically connected to any one of driving terminals 163.

The busbar 160 may include an insulating body 161, a plurality of neutral terminals 162, and a plurality of driving terminals 163.

The insulating body 161 electrically insulates the plurality of neutral terminals 162 from the plurality of driving terminals 163. The insulating body 161 may include a plurality of insertion grooves 161*b* in which the plurality of driving terminals 163 may be installed. The neutral terminal 162 is integrally injected with the insulating body 161 as example, but is not limited thereto. A material of the insulating body 161 is not specifically limited as long as the material has an insulating property. For example, the insulating body 161 may be formed by injection-molding a plastic resin.

The plurality of insertion grooves 161*b* may be formed to have a predetermined distance to electrically insulate the driving terminals 163. A distance between the insertion grooves 161*b* may be 0.5 mm to 2.0 mm, but is not limited thereto. The plurality of insertion grooves 161*b* may have the same spiral shape. The insulating body 161 may have a circular plate shape in which a first hole 161*a* is formed in a center thereof, but is not limited thereto.

The neutral terminal 162 may serve to connect neutral points of the plurality of coils 142. Here, the neutral terminal 162 may include the plurality of neutral terminals 162 which are electrically insulated. Accordingly, the motor 100 may include a plurality of neutral points, and the plurality of neutral points may be electrically insulated.

The plurality of driving terminals 163 may be connected to a power terminal 164. That is, the driving terminal 163 may be structurally separated from the power terminal 164. In such a structure, an inverter may be directly connected to an upper side of the busbar 160, and the structure of the power terminal 164 may be suitably changed according to a structure of the motor. However, the structure of the power terminal 164 is not limited thereto and may also be a power cable type. The power terminal 164 may include a plurality of connection fins 164*b* electrically connected to the plurality of driving terminals 163 and a fixed part 164*a* at which the connection fins 164*b* are disposed.

The plurality of driving terminals 163 may serve to supply three-phase power to the coil 142. A three-phase circuit may be formed by electrically connecting the terminals of the busbar 160 and the coils 142.

The plurality of driving terminals 163 may include a plurality of first driving terminals UT1 and UT2, second driving terminals VT1 and VT2, and third driving terminals WT1 and WT2. The first driving terminals UT1 and UT2 may be U-phase terminals, the second driving terminals VT1 and VT2 may be V-phase terminals, and the third driving terminals WT1 and WT2 may be W-phase terminals.

The U-phase terminals UT1 and UT2 may include a first U-phase terminal UT1 and a second U-phase terminal UT2, the V-phase terminals VT1 and VT2 may include a first V-phase terminal VT1 and a second V-phase terminal VT2, and the W-phase terminals WT1 and WT2 may include a first W-phase terminal WT1 and a second W-phase terminal WT2. In such a configuration, a plurality of three-phase circuits may be formed in the motor. However, the number of terminals is not limited.

Referring to FIGS. 3 and 4, the motor may include two independent three-phase circuits. A first circuit may be formed by connecting the first U-phase terminal UT1, the first V-phase terminal VT1, and the first W-phase terminal WT1 to a plurality of coils U1, U3, V1, V3, W1, and W3.

The second circuit may be formed by connecting the second U-phase terminal UT2, the second V-phase terminal VT2, and the second W-phase terminal WT2 to a plurality of coils U2, U4, V2, V4, W2, and W4. The first circuit may be an independent circuit connected by a first neutral point N1, and the second circuit may be an independent circuit connected by a second neutral point N2.

Here, a set of coils constituting the first circuit may be defined as a first coil set U1, U3, V1, V3, W1, and W3, and a set of coils constituting the second circuit is defined as a second coil set U2, U4, V2, V4, W2, and W4.

Referring to FIG. 4, a motor may also include four neutral points N1 to N4. A first circuit may include a first neutral point N1 and a second neutral point N2, and a second circuit may include a third neutral point N3 and a fourth neutral point N4. A three-phase circuit may also have more neutral points as necessary.

Referring to FIG. 5, four neutral terminals 162 may be disposed to include four neutral points which are electrically insulated. Here, the neutral terminals 162 may have the same shape. Specifically, the neutral terminal may include a body portion 1621 having a curvature, an extension portion 1622 bent in the direction of the shaft, and a connection portion 1623.

However, the neutral terminal is not limited thereto. Two neutral terminals 162 may also be disposed to include two neutral points as illustrated in FIG. 3, and shapes thereof may also be different.

Figure 6:
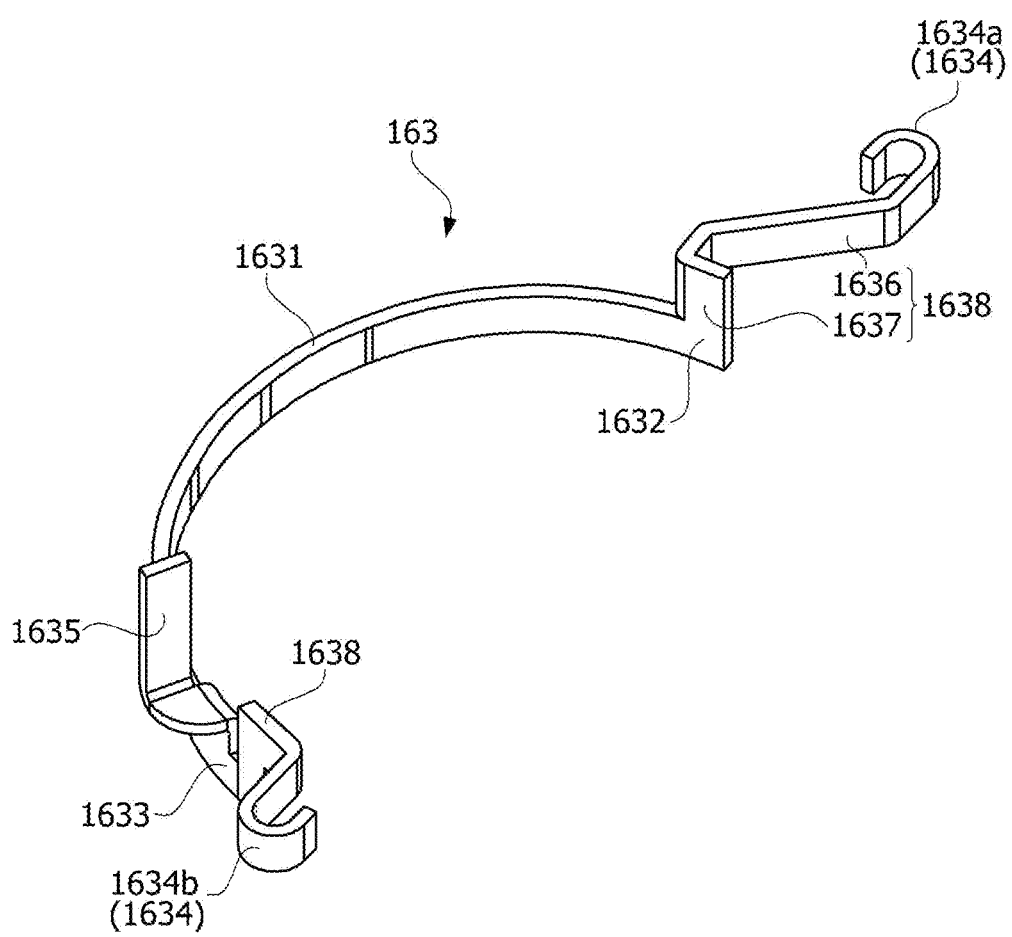
FIG. 6 is a view for describing a shape of a driving terminal.
Figure 7:
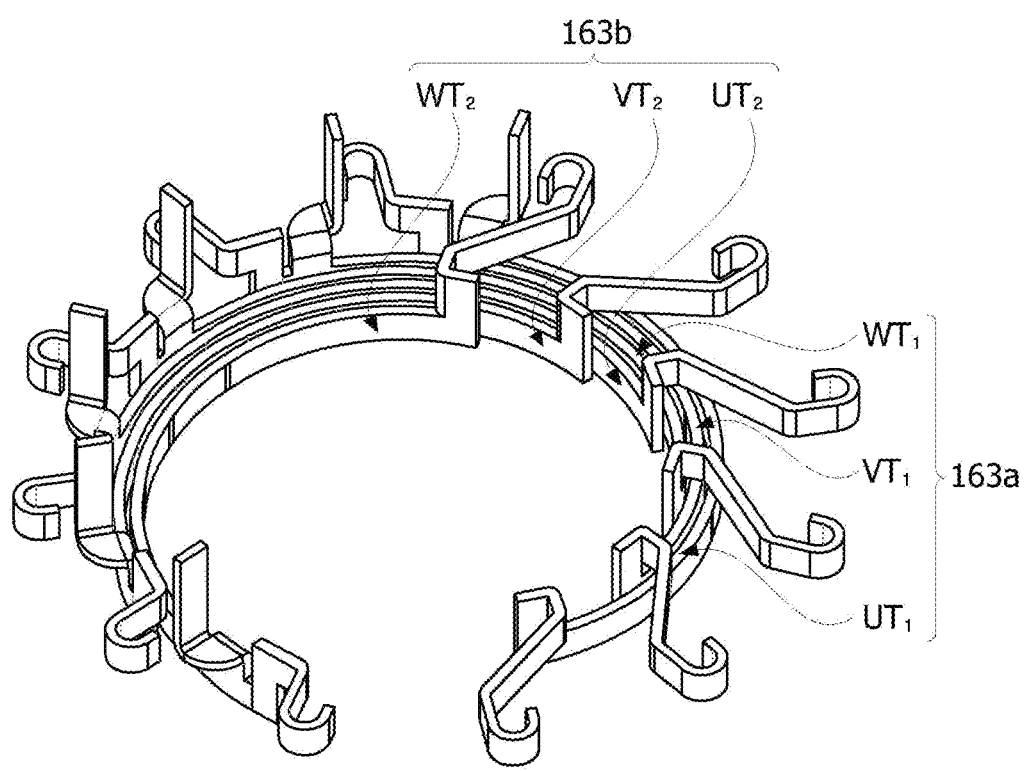
FIG. 7 is a view for describing an arrangement of a plurality of driving terminals.
Figure 8:
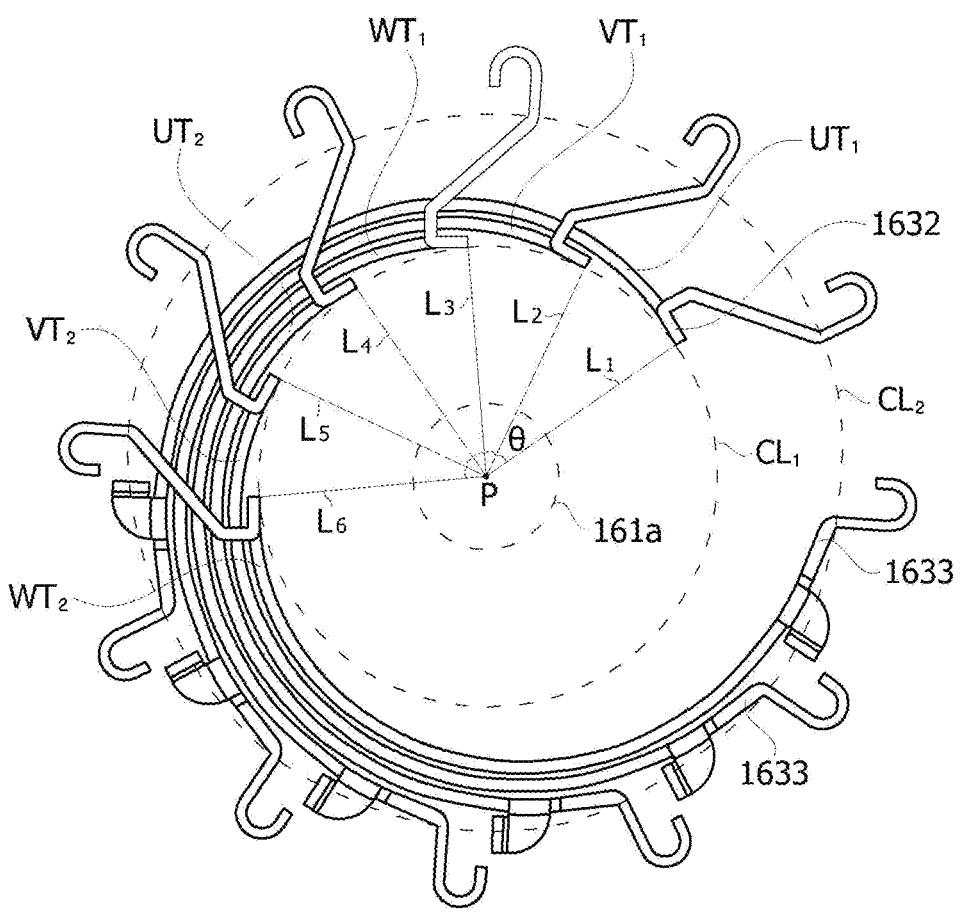
FIG. 8 is a plan view of FIG. 7.

FIG. 6 is a view for describing a shape of a driving terminal, FIG. 7 is a view for describing an arrangement of a plurality of driving terminals, and FIG. 8 is a plan view of FIG. 7.

Referring to FIG. 6, each of the plurality of driving terminals 163 may include a body portion 1631, a connection portion 1634 connected to the body portion 1631, and a terminal portion 1635 protruding from the body portion 1631 in the direction of the shaft.

The body portion 1631 extends in a predetermined length to connect a plurality of connection portions 1634. The body portion 1631 may have a strip shape having a curvature. A radius of the curvature of the body portion 1631 may change from one end 1632 toward the other end 1633.

The body portion 1631 may have a spiral shape. Here, the spiral shape may be defined as a shape in which a radius of a curvature changes from the one end 1632 toward the other end 1633. A radius of the curvature may increase from the one end 1632 toward the other end 1633. However, the radius of the curvature is not limited thereto, and may also decrease from the one end toward the other end. The radius of the curvature at the one end 1632 is 20 mm, and a radius of the curvature at the other end 1633 may be 30 mm, but the radii are not limited thereto.

As described above, the plurality of terminals configured to connect phases are disposed in the motor according to the embodiment as described above. Accordingly, the number of terminals may increase to two times that of a conventional motor. Such a spiral shape may be advantageous for arranging the plurality of terminals in a limited space. A thickness of the body portion 1631 may range from 0.5 to 2.0 mm, but is not limited thereto.

The connection portion 1634 is a portion electrically connected to the coil. The connection portion 1634 may have a hook or Y shape, but is not limited thereto. The connection portion 1634 may include a first connection portion 1634a connected to the one end 1632 of the body portion 1631 and a second connection portion 1634b connected to the other end 1633 of the body portion 1631. The number of connection portions may be increased as necessary.

The terminal portion 1635 may protrude from the body portion 1631 in the direction of the shaft. The terminal portion 1635 may be connected to an external power or an inverter to supply power to the connection portion 1634.

An extension portion 1638 may be formed between the body portion 1631 and the connection portion 1634.

The extension portion 1638 may include a first bent portion 1637 protruding in the direction of the shaft and a second bent portion 1636 extending from the first bent portion 1637 in a direction perpendicular to the shaft. A height of the connection portion 1634 may be determined according to that of the first bent portion 1637. The terminal portion 1635 may also be disposed on the extension portion 1638.

A length of the second bent portion 1636 connected to the first connection portion 1634a may be longer than that of the second bent portion 1636 connected to the second connection portion 1634b. Such a structure may expose the connection portion at the outside of the insulating body to allow the connection portion to be electrically connected to the coil in a spiral type arrangement.

Referring to FIG. 7, all of the plurality of U-phase terminals UT1 and UT2, the V-phase terminals VT1 and VT2, and the W-phase terminals WT1 and WT2 may have the same shape. In this case, since the terminals do not need to be separately manufactured, there is an effect in that a manufacturing cost is reduced, and there is an advantage in that an assembly is simplified.

All of the plurality of U-phase terminals UT1 and UT2, V-phase terminals VT1 and VT2, and W-phase terminals WT1 and WT2 may be disposed to be coplanar. That is, the plurality of U-phase terminals UT1 and UT2, V-phase terminals VT1 and VT2, and W-phase terminals WT1 and WT2 may be connected to the coils at the same height.

The first U-phase terminal UT1, the first V-phase terminal VT1, and the first W-phase terminal WT1 may be a first terminal set 163a constituting the first circuit, and the second U-phase terminal UT2, the second V-phase terminal VT2, and the second W-phase terminal WT2 may be a second terminal set 163b constituting the second circuit.

Referring to FIG. 8, a diameter of a first virtual circle CL1 which connects the one ends 1632 of the first U-phase terminal UT1, the second U-phase terminal UT2, the first V-phase terminal VT1, the second V-phase terminal VT2, the first W-phase terminal WT1 and the second W-phase terminal WT2 may be less than that of a second virtual circle CL2 which connects the other ends 1633 thereof. Accordingly, the first U-phase terminal UT1, the second U-phase terminal UT2, the first V-phase terminal VT1, the second V-phase terminal VT2, the first W-phase terminal WT1 and the second W-phase terminal WT2 may be densely disposed in a limited space.

Here, a diameter of the first hole 161a formed in the insulating body may be less than that of the first virtual circle CL1, and the first hole 161a, the first virtual circle CL1, and the second virtual circle CL2 may have the same center P. In addition, all angles θ between virtual lines L1 to L6 from the center P to the one ends 1632 of the terminals may be the same.

Figure 9:
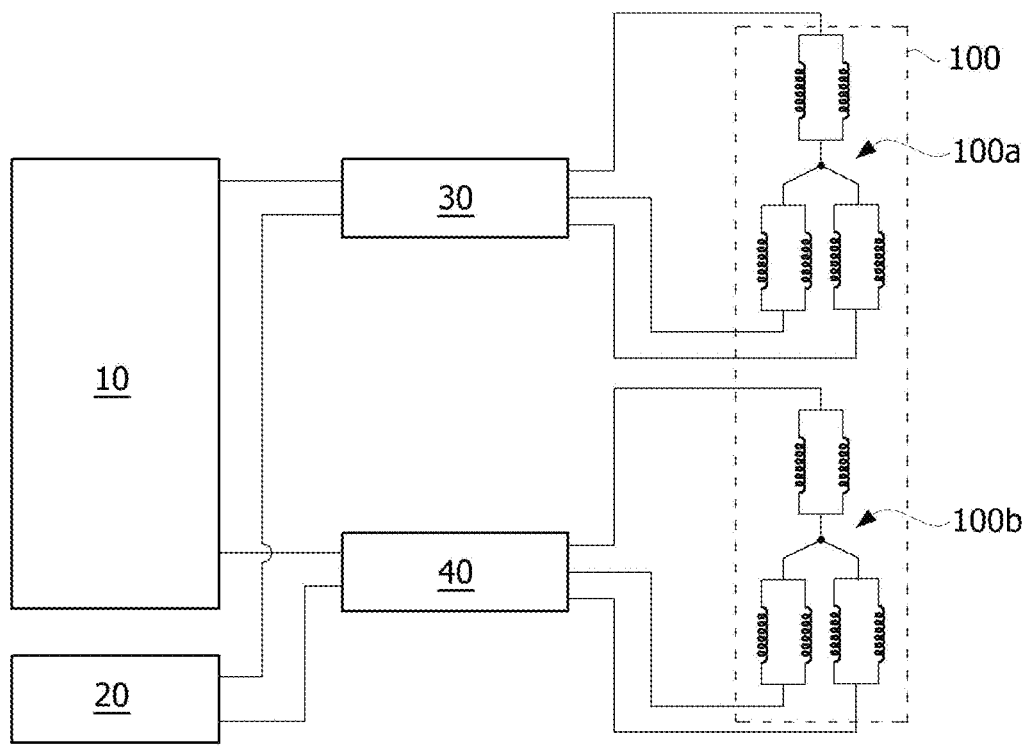
FIG. 9 is a block diagram of a power transmission system according to one embodiment of the present invention.
Figure 10:
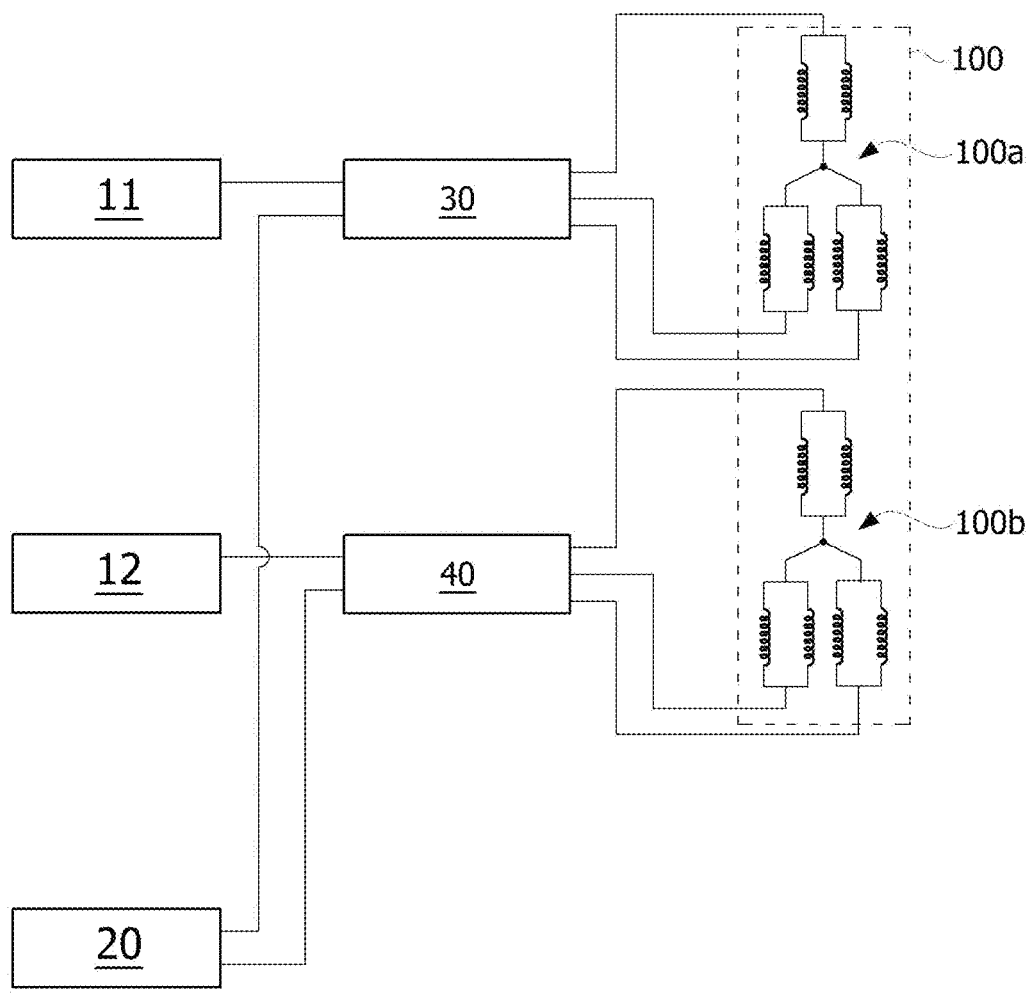
FIG. 10 is a view illustrating a modified example of FIG. 9.

FIG. 9 is a block diagram of a power transmission system according to one embodiment of the present invention, and FIG. 10 is a modified example of FIG. 9.

Referring to FIG. 9, a power transmission system according to one embodiment of the present invention includes a motor 100 having a first circuit 100a and a second circuit 100b, a first driving unit 30 electrically connected to the first circuit 100a, a second driving unit 40 electrically connected to the second circuit 100b, and a control unit 10 configured to control the first driving unit 30 and the second driving unit 40.

The first circuit 100a and the second circuit 100b of the motor 100 having the same configurations as described above may be included in the power transmission system. The first circuit 100a includes a first coil set and a first terminal set configured to electrically connect the first coil set, and the second circuit 100b includes a second coil set and a second terminal set configured to electrically connect the second coil set.

The first terminal set may include a first U-phase terminal UT1, a first V-phase terminal VT1, and a first W-phase terminal WT1, and the second terminal set may include a second U-phase terminal UT2, a second V-phase terminal VT2, and a second W-phase terminal WT2.

Each of the first driving unit 30 and the second driving unit 40 may be an inverter configured to convert direct current (DC) power supplied from a power source 20 into three-phase power. The power source 20 may be a vehicle battery.

The first driving unit 30 may be connected to U-phase, V-phase, and W-phase of the first circuit 100a to supply three-phase power to the first circuit 100a, and the second driving unit 40 may be connected to U-phase, V-phase, and W-phase of the second circuit 100b to supply three-phase power to the second circuit 100b. That is, the first driving unit 30 and the second driving unit 40 may independently drive the first circuit 100a and the second circuit 100b. Accordingly, even in a case in which any one of the first driving unit 30 and the second driving unit 40 does not operate, the motor 100 may be operated by the remaining driving unit. Accordingly, the power transmission system may be suitable for the field such as a vehicle demanding a high level of safety.

The control unit 10 may output a control signal to the first driving unit 30 and the second driving unit 40 according to driving conditions detected by a vehicle speed sensor, torque angle sensor, torque sensor, and the like. The control unit 10 may be an electronic control unit (ECU). Referring to FIG. 10, the control unit 10 may include a first control unit 11 configured to control the first driving unit 30 and a second control unit 12 configured to control the second driving unit 40. In this case, even in a case in which any one of the first control unit 11 and the second control unit 12 does not operate, the motor may be controlled by the remaining control unit.

The invention claimed is:

1. A busbar comprising:
an insulating body;
a plurality of first driving terminals disposed on the insulating body;
a plurality of second driving terminals disposed on the insulating body;
a plurality of third driving terminals disposed on the insulating body; and
a neutral terminal disposed on the insulating body,
wherein a first end of the plurality of first driving terminals, a first end of the plurality of second driving terminals, and a first end of the plurality of third driving terminals are disposed on a first virtual circle,
wherein a second end of the plurality of the first driving terminals, a second end of the plurality of the second driving terminals, and a second end of the plurality of the third driving terminals are disposed on a second virtual circle,
wherein a diameter of the second virtual circle is greater than a diameter of the first virtual circle,
wherein a center of the first virtual circle is identical to a center of the second virtual circle, and
wherein the neutral terminal comprises a curved body portion.

2. The busbar of claim 1, wherein the plurality of first driving terminals, the plurality of second driving terminals, and the plurality of third driving terminals have the same shape.

3. The busbar of claim 1, wherein each first terminal of the plurality of first driving terminals, each second terminal of the plurality of second driving terminals, and each third terminal of the plurality of third driving terminals comprises:
a body portion comprising the first end and the second end;
a connection portion connected to the first end of the body portion; and
a terminal portion protruding from the body portion in a direction of a shaft.

4. The busbar of claim 3, wherein each connection portion comprises a first connection portion connected to the first end of the body portion and a second connection portion connected to the second end of the body portion.

5. The busbar of claim 4, wherein each first terminal of the plurality of first driving terminals, each second terminal of the plurality of second driving terminals, and each third terminal of the plurality of third driving terminals comprises an extension portion disposed between the connection portion and the body portion,
wherein the extension portions extend in a direction perpendicular to the direction of the shaft; and
wherein a length of the extension portions connected to the first connection portion is different from a length of the extension portions connected to the second connection portion.

6. The busbar of claim 5, wherein the length of the extension portions connected to the first connection portion is greater than the length of the extension portions connected to the second connection portion.

7. The busbar of claim 1, wherein the neutral terminal comprises a plurality of neutral terminals, and
wherein shapes of the plurality of neutral terminals are identical.

8. The busbar of claim 1, wherein the insulating body includes insertion grooves in which the plurality of first driving terminals, the plurality of second driving terminals, and the plurality of third driving terminals are disposed.

9. The busbar of claim 1, wherein the plurality of first driving terminals, the plurality of second driving terminals, and the plurality of third driving terminals are coplanar.

10. A busbar comprising:
an insulating body;
a plurality of first driving terminals disposed on the insulating body;
a plurality of second driving terminals disposed on the insulating body;
a plurality of third driving terminals disposed on the insulating body; and
a neutral terminal disposed on the insulating body,
wherein each first terminal of the plurality of first driving terminals, each second terminal of the plurality of second driving terminals, and each third terminal of the plurality of third driving terminals comprises:
a body portion comprising a first end and a second end;
a connection portion connected to the first end of the body portion; and
a terminal portion protruding from the body portion in a direction of a shaft,
wherein at least one of the plurality of first driving terminals, at least one of the plurality of second driving terminals, and at least one of the plurality of third driving terminals has the same shape,
wherein a first end of the plurality of first driving terminals, a first end of the plurality of second driving terminals, and a first end of the plurality of third driving terminals are disposed on a first virtual circle,
wherein a second end of the plurality of the first driving terminals, a second end of the plurality of the second driving terminals, and a second end of the plurality of the third driving terminals are disposed on a second virtual circle that is concentric with the first virtual circle, and
wherein the neutral terminal comprises a curved body portion.

11. A motor comprising:
a housing;
a stator disposed in the housing;
a rotor disposed in the housing;
a shaft disposed in the housing; and
a busbar disposed on the stator,
wherein the busbar comprises:
an insulating body;
a plurality of first driving terminals disposed on the insulating body;
a plurality of second driving terminals disposed on the insulating body;
a plurality of third driving terminals disposed on the insulating body; and
a neutral terminal disposed on the insulating body,
wherein a first end of the plurality of first driving terminals, a first end of the plurality of second driving terminals, and a first end of the plurality of third driving terminals are disposed on a first virtual circle, wherein a second end of the plurality of first driving terminals, a second end of the plurality of second driving terminals, and a second end of the plurality of third driving terminals are disposed on a second virtual circle, wherein a diameter of the second virtual circle is greater than a diameter of the first virtual circle, wherein a center of the first virtual circle is identical to a center of the second virtual circle.

12. The motor of claim 11, wherein the plurality of first driving terminals, the plurality of second driving terminals, and the plurality of third driving terminals have the same shape.

13. The motor of claim 11, wherein each first terminal of the plurality of first driving terminals, each second terminal of the plurality of second driving terminals, and each third terminal of the plurality of third driving terminals comprises:

a body portion comprising the first end and the second end;

a connection portion connected to the first end of the body portion; and a terminal portion protruding from the body portion in a direction of a shaft.

14. The motor of claim 13, wherein each connection portion comprises a first connection portion connected to the first end of the body portion and a second connection portion connected to the second end of the body portion.

15. The motor of claim 14, wherein each first terminal of the plurality of first driving terminals, each second terminal of the plurality of second driving terminals, and each third terminal of the plurality of third driving terminals comprises an extension portion disposed between the connection portion and the body portion, wherein the extension portions extend in a direction perpendicular to the direction of the shaft; and wherein a length of the extension portions connected to the first connection portion is different from a length of the extension portions connected to the second connection portion.

16. The motor of claim 15, wherein the length of the extension portions connected to the first connection portion is greater than the length of the extension portions connected to the second connection portion.

17. The motor of claim 11, wherein the neutral terminal comprises a plurality of neutral terminals, and wherein shapes of the plurality of the neutral terminals are identical.

18. The motor of claim 11, wherein the insulating body includes insertion grooves in which the plurality of first driving terminals, the plurality of second driving terminals, and the plurality of third driving terminals are disposed.

19. The motor of claim 11, wherein the plurality of first driving terminals, the plurality of second driving terminals, and the plurality of third driving terminals are coplanar.

20. A power transmission system comprising:

a motor including a first circuit and a second circuit;

a first driving unit electrically connected to the first circuit;

a second driving unit electrically connected to the second circuit; and a control unit configured to control the first driving unit and the second driving unit, wherein the first circuit includes a first coil set and a first terminal set configured to electrically connect the first coil set, and the second circuit includes a second coil set and a second terminal set configured to electrically connect the second coil set, wherein the first terminal set and the second terminal set comprise a plurality of first driving terminals, a plurality of second driving terminals, and a plurality of third driving terminals, wherein a first end of the plurality of first driving terminals, a first end of the plurality of second driving terminals, and a first end of the plurality of third driving terminals are disposed on a first virtual circle, wherein a second end of the plurality of first driving terminals, a second end of the plurality of second driving terminals, and a second end of the plurality of third driving terminals are disposed on a second virtual circle, wherein a diameter of the second virtual circle is greater than a diameter of the first virtual circle, wherein a center of the first virtual circle is identical to a center of the second virtual circle and wherein the neutral terminal comprises a curved body portion.

* * * * *